(12) United States Patent
Bhatia et al.

(10) Patent No.: US 11,661,022 B2
(45) Date of Patent: *May 30, 2023

(54) SENSING SYSTEM AND GLASS MATERIAL FOR VEHICLES

(71) Applicant: CORNING INCORPORATED, Corning, NY (US)

(72) Inventors: Vikram Bhatia, Painted Post, NY (US); Thomas Michael Cleary, Elmira, NY (US); Philippe Engel, Vaux le Penil (FR); Robin Merchant Walton, Redwood City, CA (US); Jue Wang, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 208 days.

This patent is subject to a terminal disclaimer.

(21) Appl. No.: 17/147,058

(22) Filed: Jan. 12, 2021

(65) Prior Publication Data

US 2021/0129784 A1 May 6, 2021

Related U.S. Application Data

(63) Continuation of application No. PCT/US2018/050863, filed on Sep. 13, 2018, and a
(Continued)

(51) Int. Cl.
*B60R 21/01* (2006.01)
*G02B 1/02* (2006.01)
(Continued)

(52) U.S. Cl.
CPC ............ *B60R 21/01* (2013.01); *G01D 11/245* (2013.01); *G02B 1/02* (2013.01); *G02B 1/14* (2015.01);
(Continued)

(58) Field of Classification Search
USPC .......................................... 359/507, 511–513
See application file for complete search history.

(56) References Cited

U.S. PATENT DOCUMENTS 5,804,719 A 9/1998 Didelot et al.
6,307,198 B1 10/2001 Asakura et al.
(Continued)

FOREIGN PATENT DOCUMENTS

WO 2018/015313 A1 1/2018

OTHER PUBLICATIONS

International Search Report and Written Opinion of the International Searching Authority; PCT/US2018/050863 dated Dec. 24, 2018, 13 pages; European Patent Office.
(Continued)

*Primary Examiner* — Jennifer D. Carruth

(57) ABSTRACT

A vehicle includes a body of the vehicle and a sensing system coupled to the body. The sensing system includes optical componentry and a glass material, where the glass material at least in part houses the optical componentry and the glass material is at least partially transparent to light at the wavelength of the optical componentry. Further the glass material has mechanical and performance properties that allow the sensing system to be positioned particularly low on the vehicle, at a position that may be of higher risk for damage from debris.

15 Claims, 3 Drawing Sheets

Related U.S. Application Data continuation of application No. 16/130,569, filed on Sep. 13, 2018, now Pat. No. 10,919,473.

(60) Provisional application No. 62/558,041, filed on Sep. 13, 2017.

(51) Int. Cl.
*G01D 11/24* (2006.01)
*G02B 1/14* (2015.01)
*G02B 7/00* (2021.01)

(52) U.S. Cl.
CPC .... *G02B 7/007* (2013.01); *B60R 2021/01006* (2013.01); *B60R 2021/01122* (2013.01)

(56) References Cited

U.S. PATENT DOCUMENTS

| | | | |
|---|---|---|---|
| 8,167,444 | B2 | 5/2012 | Lee et al. |
| 9,239,260 | B2 | 1/2016 | Bayha et al. |
| 9,297,901 | B2 | 3/2016 | Bayha et al. |
| 9,703,010 | B2 | 7/2017 | Paulson et al. |
| 10,919,473 | B2 * | 2/2021 | Bhatia .................. G01D 11/245 |
| 2003/0227663 | A1 | 12/2003 | Agrawal et al. |
| 2006/0044800 | A1 | 3/2006 | Reime |
| 2006/0164719 | A1 | 7/2006 | Georgson et al. |
| 2007/0057781 | A1 | 3/2007 | Breed |
| 2007/0217018 | A1 | 9/2007 | Fredriksson |
| 2008/0265913 | A1 | 10/2008 | Netzer |
| 2009/0153665 | A1 | 6/2009 | Linsenmaier et al. |
| 2010/0112317 | A1 | 5/2010 | Gasworth et al. |
| 2010/0220019 | A1 | 9/2010 | Boote |
| 2010/0290030 | A1 | 11/2010 | Groitzsch et al. |
| 2011/0035093 | A1 | 2/2011 | Moench et al. |
| 2012/0119937 | A1 | 5/2012 | Yamada et al. |
| 2012/0250306 | A1 | 10/2012 | Sugiyama et al. |
| 2013/0001409 | A1 | 1/2013 | Tsukagoshi et al. |
| 2013/0134300 | A1 | 5/2013 | Kamamori et al. |
| 2013/0146577 | A1 | 6/2013 | Haig et al. |
| 2015/0323793 | A1 | 11/2015 | Sakai et al. |
| 2016/0034771 | A1 | 2/2016 | Schamp |
| 2016/0291150 | A1 | 10/2016 | Hara et al. |
| 2016/0341538 | A1 | 11/2016 | Tumlinson et al. |
| 2017/0361576 | A1 | 12/2017 | Legrand et al. |
| 2017/0363741 | A1 | 12/2017 | Send et al. |
| 2018/0040650 | A1 | 2/2018 | Switzer |
| 2018/0175857 | A1 | 6/2018 | Weber et al. |
| 2019/0039940 | A1 | 2/2019 | Corden et al. |
| 2020/0200880 | A1 | 6/2020 | Stoppel |
| 2020/0262184 | A1 | 8/2020 | Cleary et al. |
| 2020/0273785 | A1 | 8/2020 | Mok |

OTHER PUBLICATIONS

European Patent Application No. 18855867.0 Extended European Search Report and Search Opinion dated Sep. 17, 2021; 7 Pages; European Patent Office.

* cited by examiner

SENSING SYSTEM AND GLASS MATERIAL FOR VEHICLES

CROSS-REFERENCE TO RELATED APPLICATIONS

This application is a continuation of U.S. application Ser. No. 16/130,569 filed on Sep. 13, 2018 which is a continuation of International Application No. PCT/US2018/050863 filed on Sep. 13, 2018 which claims the benefit of priority of U.S. Provisional Application Ser. No. 62/558,041 filed on Sep. 13, 2017, the contents of each are relied upon and incorporated herein by reference in their entirety as if fully set forth below.

BACKGROUND

Vehicles, such as autonomous or semi-autonomous vehicles, may rely on sensing systems as part of a control system or otherwise to help the vehicles interact with a surrounding environment. In some instances, the sensing systems may be optically based, such as utilizing laser light or other light sensors. Such systems tend to be protected by tough plastic covers and located on or near the top of vehicles to position the sensing system away from the path of debris, such as loose gravel, vegetation, etc.

Applicants have observed that the plastic covers may tend to become sun damaged and/or scratch and become substantially obstructed, distorting the optical signals communicated and/or received by the sensing system. Applicants believe that glass may serve as a better cover material, overcoming at least some of such problems, however Applicants believe that conventional glass cover materials may be susceptible to fracturing upon impact from debris. A need exists to overcome some or all of these challenges.

SUMMARY

A sensing system for a vehicle, such as an autonomous or semi-autonomous automobile, includes a glass material that protects internal componentry of the sensing system. The internal componentry includes optics and the glass material facilitates communication of light to and/or from the componentry. The glass material is particularly strong, scratch resistant, corrosion resistant, impact resistant, and transparent in wavelengths (e.g., infrared) at which the optics of the componentry operate. Use of a glass material in a location of higher risk for debris and resulting damage may be particularly surprising to those of skill in the art, however because of the mechanical properties of the glass material, the sensing system may be positioned on or near an underside of the vehicle, facilitating more reliable sensing of underlying surfaces.

Additional features and advantages are set forth in the Detailed Description that follows, and in part will be readily apparent to those skilled in the art from the description or recognized by practicing the embodiments as described in the written description and claims hereof, as well as the appended drawings. Still other aspects of the present disclosure relate to a method of manufacturing such articles. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings of the Figures illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
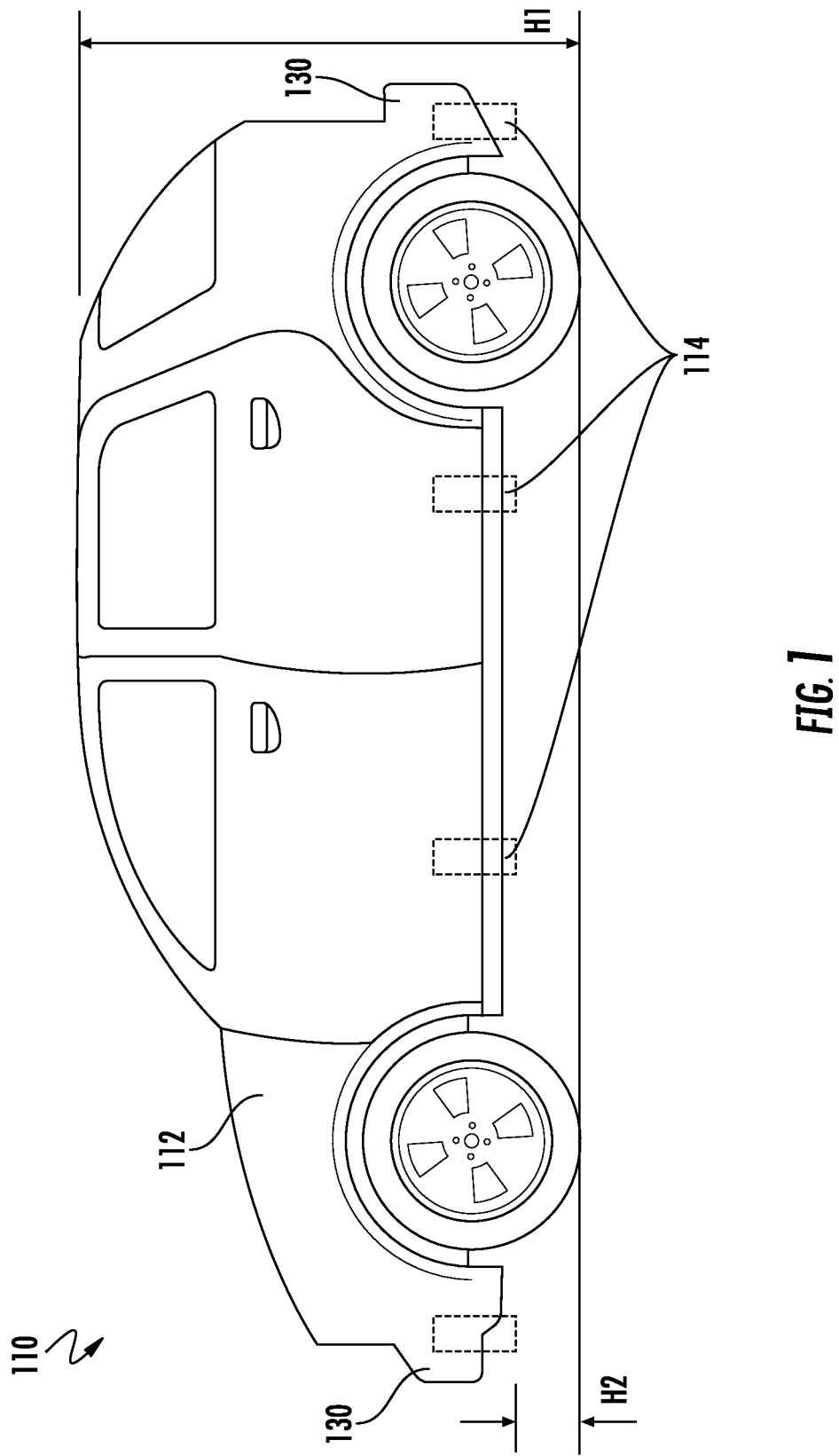
FIG. 1 is side view of a vehicle with a sensing system according to an exemplary embodiment.

Referring to FIG. 1, a vehicle 110 (e.g., car, truck, boat, plane, trailer) has a body 112 of the vehicle (e.g., housing, hull), which includes an exterior defining an outer shape of the vehicle. The body 112 may be formed from metal, such as aluminum or steel, alloys thereof, with coatings, paint, etc., and the body 112 may be supported by a structural frame and may overlay a chassis of the vehicle 110, such as with vehicles that are automobile (e.g., cars, trucks, vans, tractor or semi-trailers). According to an exemplary embodiment, the vehicle further includes a sensing system 114 coupled to (e.g., fastened to, physically attached directly or indirectly to such as via the frame, rigidly attached to) the body 112 of the vehicle 110.

Figure 2:
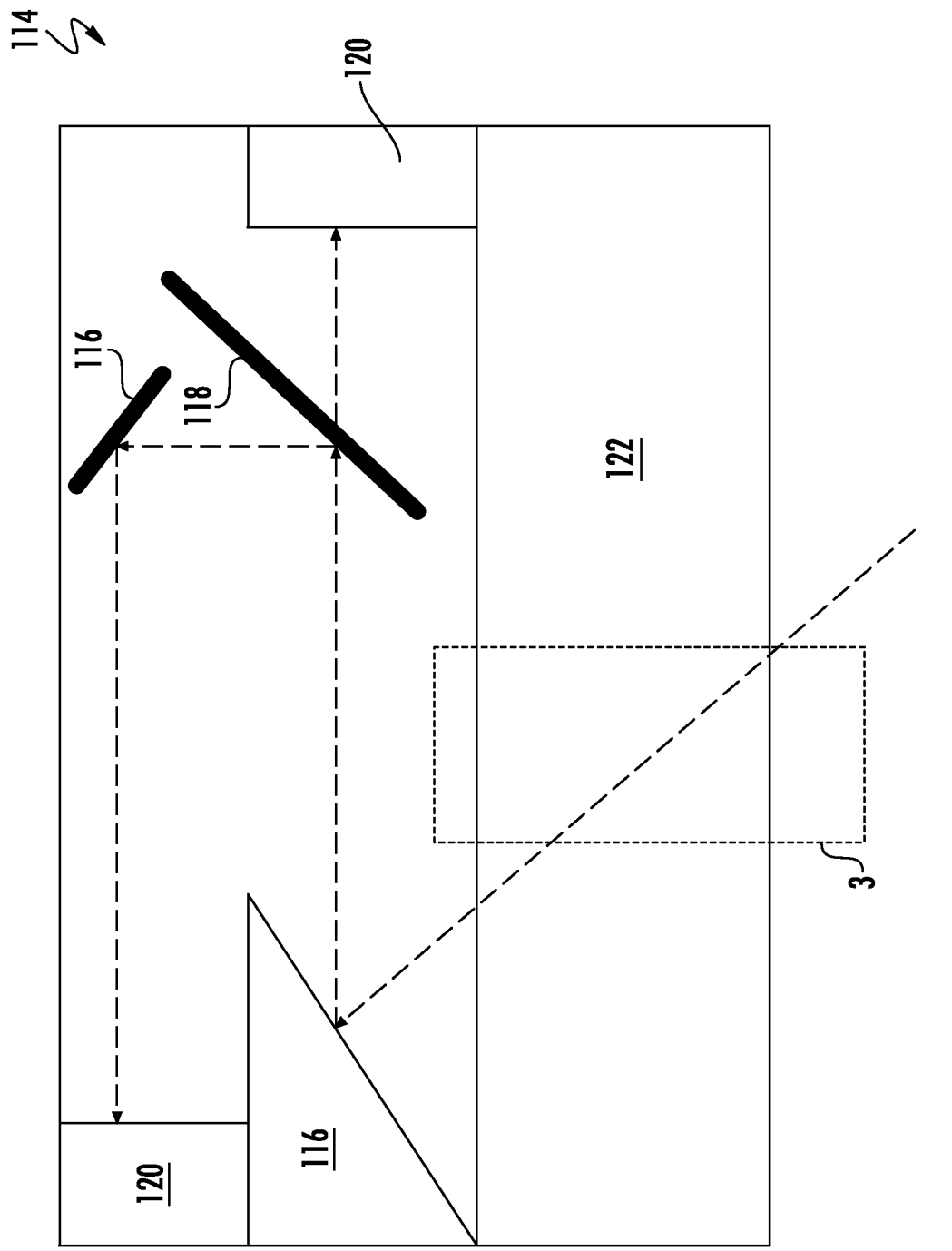
FIG. 2 is a conceptual diagram in cross-section of a sensing system of FIG. 1.

Referring to FIG. 2, in some embodiments, the sensing system 114 includes optical componentry, such as reflectors 116, a beam splitter 118, and optical sensors 120, for example. According to an exemplary embodiment, the sensing system 114 further includes a glass material 122, where the glass material 122 at least in part houses the optical componentry, such as by forming a wall or a window surrounding or adjoining the optical componentry. In operation, light may pass through the glass material 122 to and/or from the optical componentry of the sensing system 114. In some such embodiments, the sensing system 114 is an optical surveying system, such as a so-called light detection and ranging system.

Figure 3:
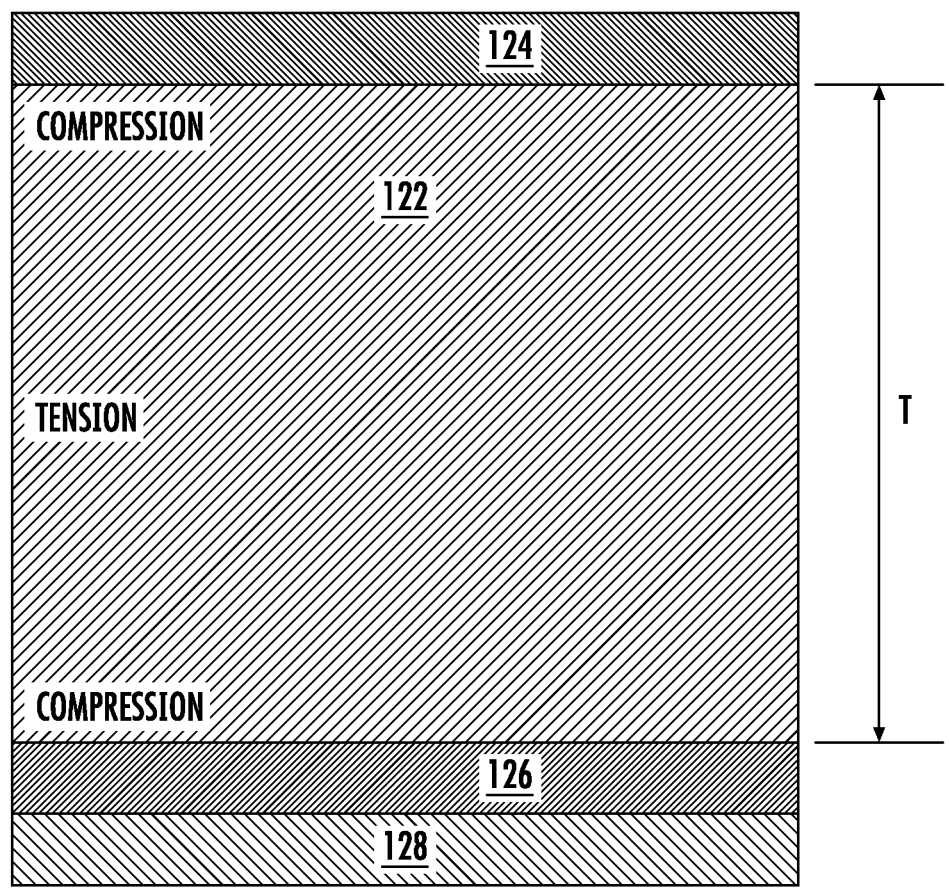
FIG. 3 is a conceptual diagram in cross-section of a glass material of the sensing system of FIG. 2 according to an exemplary embodiment.

Referring to FIG. 3, the glass material 122 is at least partially transparent to light at a wavelength of the optical componentry. Further, the glass material 122 may also be adjoined or coated by layers of material that improve performance of the sensing system 114. In some embodiments, the glass material 122 is coated with an antireflective coating 124, 126, such as to increase an angle of acceptance for light to be received by the sensing system 114. The antireflective coating 124 may be located on an inside surface, facing the optical componentry of the sensing system 114, and/or the antireflective coating 126 may be located on an outside surface of the glass material 122, facing away from the optical componentry.

In some embodiments, the glass material 112 may be coated with a plurality of layers, as shown in FIG. 3, such as a protective coating 128 (e.g., anti-scratch, anti-corrosive, UV resistant), overlaying the antireflective coating 126, overlaying the glass material 122. According to an exemplary embodiment, the optical componentry receives and senses light at a wavelength λ, (e.g., dashed arrows of FIG. 2), and one or more of the coatings and/or the glass material facilitate the interaction by allowing transmission of light therethrough at the wavelength, such as at least 30% transmission at one or more wavelengths between 10 nm and 1 cm, such as at least 40%, such as at least 50%, such as at one or more wavelengths between 300 nm and 1000 nm. In some embodiments, the wavelength λ, is or is about 905 nm, 1550 nm, or other wavelengths. In some embodiments, the coatings block UV and/or visible light (e.g., wavelengths less than about 730 nm).

According to an exemplary embodiment, the body 112 of the vehicle has a height H1, defined as a greatest vertical distance between structure (e.g., roof, top) of the vehicle 110 and an underlying flat surface (e.g., roadway) when the vehicle is in a operational orientation, meaning where the vehicle is intended to be operated, such as with wheels on the ground for a car, not turned upside down or stacked on an end for example.

According to an exemplary embodiment, the glass material 122 includes (e.g., is, is mostly, is at least 80% by weight) a silicate, such as an alkali-aluminosilicate glass. In some such embodiments, the glass material is an amorphous glass. The glass material may be strengthened, such as by ion-exchange, thermal tempering, and/or laminating and cooling a sandwich of glasses so that an interior layer of glass is in tension and exterior layers are in compression. According to an exemplary embodiment, the glass material 122 has a strength profile (see generally shading in FIG. 3) such that regions of compressive stress sandwich a region of tensile stress, and wherein the region of tensile stress is located in a middle of the thickness T of the glass material. In some such embodiments, the glass material 122 is a contiguous sheet, but composition of the glass material 122 is a function of depth into the thickness T, such as due to increase in certain ions (e.g. potassium, lithium, sodium) near a surface of the glass material 122, such as where the middle of the thickness T has a composition that physically divides and compositionally differs from that of regions adjoining the middle, on either side thereof. In other embodiments, the glass material is a glass-ceramic, such as having crystals formed therein to increase toughness. The glass-ceramic may be strengthened, such as by one or more of the above treatments.

In some embodiments, the glass material is a sheet (e.g., curved sheet, flat sheet), having a thickness T. According to an exemplary embodiment, the glass material 122 is thick, such as where the thickness T is at least 1 mm, whereby thermal tempering and/or ion-exchange may be used to provide a particularly high compressive stress and/or depth of layer for the compressive stress into the glass material 122. In some embodiments, the thickness T is no more than 1 cm, such as no more than 5 mm, such as no more than 4 mm, whereby the glass material provides transparency for the optical componentry and is relatively lightweight.

Surprisingly the mechanical properties of the glass material are such that the glass material 122 of the sensing system 114 is positioned at a height H2 (FIG. 1), defined as a lowest or least vertical distance between the glass material 122 and an underlying flat surface when the vehicle 110 is in a operational orientation, where height H2 is less than 70% of height H1, such as where the sensing system 114 is below the roof or top of the vehicle. In some such embodiments, the height H2 is less than 50% of height H1, surprisingly close to the road or other underlying surface for glass material of a sensing system.

Referring again to FIG. 1, in some embodiments the vehicle is an automobile, such as a car, van, truck, trailer, and the body of the vehicle includes bumpers 130, such as front bumper and/or a rear bumper made from steel or another tough material to absorb shock of a collision. Accordingly, bumpers are particular strong and are made to handle impacts from debris etc. According to an exemplary embodiment, the glass material 122 is so strong and tough that the glass material 122 of the sensing system 114 is coupled to the body within 1 m of the bumper 130, such as within 50 cm, such as within 10 cm, such as adjoining. In some embodiments, at least part of the glass material 122 of the sensing system 114 extends vertically below the bumper 130.

The construction and arrangements of the methods and products, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A vehicle, comprising:
   a body comprising a height H1 defined as a greatest vertical distance between structure of the vehicle and an underlying flat surface when the vehicle is in an operational orientation;
   a sensing system coupled to the body, the sensing system comprising optical componentry that senses light at a wavelength and a silicate glass material that is at least partially transparent to light at the wavelength of the optical componentry and at least in part houses the optical componentry; and
   wherein the silicate glass material is positioned at a height H2 defined as a least vertical distance between the silicate glass material and the underlying flat surface when the vehicle is in the operational orientation, and height H2 is less than 70% of height H1.

2. The vehicle of claim 1, wherein height H2 is less than 50% of height H1.

3. The vehicle of claim 1, wherein a thickness T of the silicate glass material is less than one centimeter.

4. The vehicle of claim 1, wherein the silicate glass material is strengthened by ion-exchange, thermal tempering, and/or laminating.

5. The vehicle of claim 4, wherein a strength profile of the silicate glass material is such that regions of compressive stress of the silicate glass material sandwich a region of tensile stress of the silicate glass material, and the region of tensile stress is located in a middle of the thickness T.

6. The vehicle of claim 4, wherein a thickness T of the silicate glass material is at least one millimeter.

7. The vehicle of claim 1, wherein the silicate glass material comprises an alkali-aluminosilicate glass.

8. A vehicle, comprising:
a body of the vehicle, wherein the vehicle is an automobile and the body comprises a bumper;
a sensing system coupled to the body, the sensing system comprising optical componentry that senses light at a wavelength and a silicate glass material that is at least partially transparent to light at the wavelength of the optical componentry and at least in part houses the optical componentry; and
wherein the silicate glass material is coupled to the body within one meter of the bumper.

9. The vehicle of claim 8, wherein a thickness T of the silicate glass material is less than one centimeter.

10. The vehicle of claim 8, wherein the silicate glass material is strengthened by ion-exchange, thermal tempering, and/or laminating.

11. The vehicle of claim 10, wherein a strength profile of the silicate glass material is such that regions of compressive stress of the silicate glass material sandwich a region of tensile stress of the silicate glass material, and the region of tensile stress is located in a middle of the thickness T.

12. The vehicle of claim 10, wherein a thickness T of the silicate glass material is at least one millimeter.

13. The vehicle of claim 8, wherein at least part of the silicate glass material extends below the bumper.

14. The vehicle of claim 8, wherein the silicate glass material forms a sheet.

15. The vehicle of claim 8, wherein the silicate glass material comprises an alkali-aluminosilicate glass.

* * * * *